Sept. 4, 1962     I. S. WESTERBACK     3,052,122

FLIGHT PATH ANGLE COMPUTER

Filed Sept. 23, 1959

INVENTOR
*IVAR S. WESTERBACK*
BY
ATTORNEY

United States Patent Office 3,052,122
Patented Sept. 4, 1962

3,052,122
FLIGHT PATH ANGLE COMPUTER
Ivar S. Westerback, Glenhead, N.Y., assignor to Sperry Rand Corporation, Great Neck, N.Y., a corporation of Delaware
Filed Sept. 23, 1959, Ser. No. 841,833
10 Claims. (Cl. 73—178)

This invention relates to apparatus for use in the navigation and control of aircraft, and particularly, to apparatus for controlling the pitch attitude of the craft in such a manner that the craft follows a flight path making a desired or selected angle with respect to the horizontal. The apparatus is equally applicable for the automatic control of the aircraft through an automatic pilot, or in the manual control thereof, through the use of an indicator indicating the flight path angle directly, or through the use of an indicating instrument of the flight directed type, such as that disclosed in U.S. Patent No. 2,613,352 in the name of S. Kellogg II, and assigned to the same assignee as the present invention.

Heretofore, it has been proposed to control the pitch attitude of the craft so that the path along which the aircraft travels makes a predetermined angle with respect to the geo-horizontal regardless of the craft's attitude. Such an angle will hereinafter be referred to as the angle of the craft's flight path or the flight path angle of the aircraft and will be designated by the symbol $\gamma$. As is known, the flight path angle may be defined as the algebraic sum of the craft pitch attitude angle $\theta$ and the craft angle of attack $\alpha$. Signals representing $\theta$ and $\alpha$ may be respectively derived from a vertical gyro and an angle of attack sensor. When algebraically added together, these signals produce a signal representing the flight path angle $\gamma$.

Because the vertical gyroscope usually used in the measurement of pitch attitude is subject to drift which occurs over a comparatively long time period before being corrected, measurement of the flight path angle by algebraically summing a pitch signal and an angle of attack signal is insufficient to insure accurate measurement of $\gamma$. Therefore, as proposed in the prior art, a second measurement of flight path angle, which is stable over a long period of time, is utilized to monitor the flight path angle measurement made from the summation of $\theta$ and $\alpha$.

Still, the above-described flight path angle measurement technique has additional undesirable aspects. The measurement of the angle of attack $\alpha$ is usually made by a probe extending from the wing of the aircraft and, because of the probe's location and the aircraft's structural deformation in the airstream, the measure of angle of attack is susceptible to large errors. In addition, the probe is a protuberance from the aircraft and causes an increased drag on the air frame by disturbing the air flow around the craft.

To overcome this disadvantageous need for an angle of attack sensor, the apparatus of the present invention computes, in place of the algebraic summation of pitch angle and angle of attack, an expression of flight path angle which is equally as responsive over a short time period, but which requires no angle of attack data.

The instant apparatus computes the total of the accelerations which the aircraft experiences along the aircraft's yaw axis. One of these yaw axis accelerations is centripetal acceleration. Centripetal acceleration, however, is only experienced if the flight path angle is changing. The reason for this is that an aircraft in flight must change its pitch attitude in order to change its flight path angle. When the pitch is changed, the forward movement of the aircraft relative to the air mass in which the craft is located produces a force on the craft which tends to move the craft in the direction of its yaw axis. This force on the aircraft is reflected in an acceleration, i.e. centripetal acceleration, the magnitude of which is determined by the aircraft's speed relative to the air mass multiplied by the rate of change of flight path angle. Since the aircraft's centripetal acceleration is determined by the aircraft's speed relative to the air mass, i.e. airspeed, multiplied by the rate at which the flight path angle is changing, a measure of flight path angle may be had by integrating a signal which is representative of the quotient of the aircraft's airspeed divided into the aircraft's total yaw axis acceleration less the algebraic sum of all of the individual yaw axis accelerations other than the centripetal acceleration. Computation, as just described, is greatly simplified in the case where the aircraft pitches and rolls to only a small degree. In such cases, the total yaw axis acceleration is merely the algebraic sum of the centripetal and gravitational accelerations. If, however, large pitch and roll angles are experienced the total yaw axis acceleration is the algebraic sum of the centripetal acceleration plus the gravitational acceleration multiplied by the cosines of the pitch and roll angles.

Measurement of the total yaw axis acceleration may be readily made by an accelerometer. However, accelerometers, like vertical gyroscopes and angle of attack sensors, detect and measure accurately short period changes but are inaccurate in detecting and measuring changes which occur over an extended time period. Because of this, computation of flight path angle from data derived from an accelerometer will also be inaccurate over long time periods. To compensate for this long term inaccuracy in the measurement of the flight path angle, the instant invention employs the prior art technique of monitoring the flight path angle measurement accurate only over a short time period by a flight path angle measurement which is accurate only over a long time period. This monitoring technique as utilized in the present invention will be explained in detail later.

Accordingly, it is the prime object of the present invention to provide apparatus for computing an aircraft's flight path angle without the need for angle of attack data, the computation being accurate over both long and short time periods.

Another object of the invention is to provide apparatus which does not require an accurate measurement of an aircraft's airspeed to accurately compute said aircraft's flight path angle.

Another object is to provide apparatus to accurately compute the flight path angle of an aircraft, said apparatus requiring the detection and accurate measurement of signals representing the short period changes of only a single system variable.

These and other objects of the invention will become appreciated as the same becomes understood in the light of the specification and drawings of which—

Figure 1:
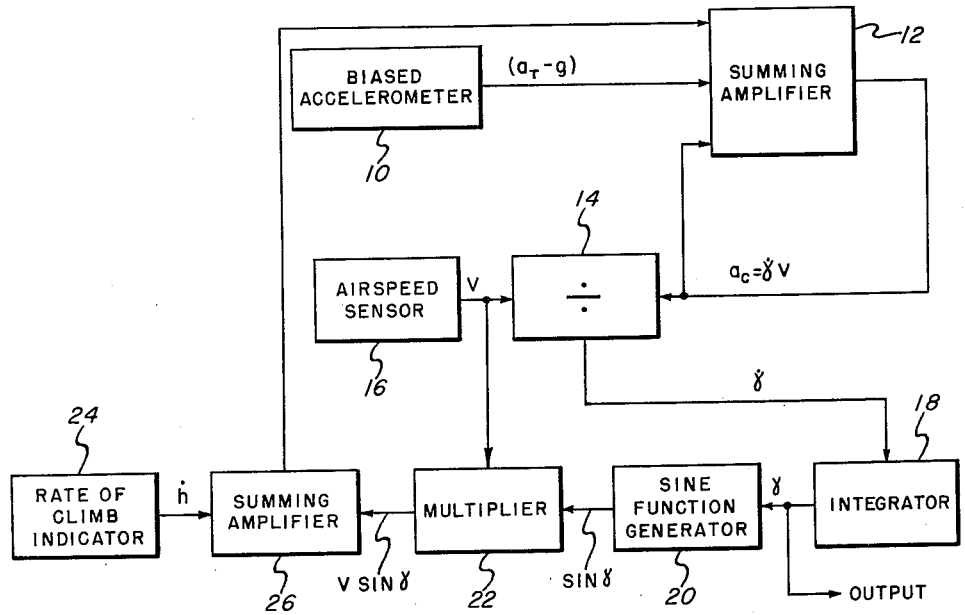
FIG. 1 is a block diagram of a preferred form of the invention.

Referring to FIG. 1, an accelerometer 10, which is mounted in the aircraft in such a way that it measures the aircraft's total accelerations $a_T$ along the yaw axis, is biased by an amount equal to the gravitational acceleration $g$ to provide an output signal $a_T - g$. This signal $a_T - g$ is coupled to a summing amplifier 12 together with the output signal from the summing amplifier 12. If the total acceleration $a_T$ should change due to a change in flight path angle the output acceleration signal from summing amplifier 12 will correspondingly change. Since the output signal is fed back to the summing amplifier 12, it tends to null out the effects of the change in total acceleration $a_T$. Nulling out the change in $a_T$, i.e. making the algebraic sum of all yaw axis accelerations equal to zero, can only be achieved if the feedback signal equals the centripetal acceleration.

The centripetal acceleration signal $a_C$ at the output of summing amplifier 12 is coupled to a divider 14 together with a signal V representative of the craft's airspeed, said airspeed signal being derived from an airspeed sensor 16. Since, as was earlier stated, centripetal acceleration is the product of the rate of change of flight path angle multiplied by the craft airspeed, division of a signal representing the centripetal acceleration $a_C$ by a signal representing the craft airspeed V will yield a signal representative of the rate at which the flight path angle is changing. The rate of change of flight path angle signal available at the output of divider 14 is coupled to an integrator 18 wherein it is integrated to provide a signal representing the flight path angle $\gamma$. Integrator 18 also serves to filter out spurious signals which arise in the computation of the flight path angle and which are coupled to integrator 18.

However, as earlier stated, the signal $\gamma$, because it is derived from accelerometer output data, is subject to errors which tend to accumulate over extended time periods. Therefore, long term compensation is provided as follows:

It is known that the aircraft's rate of climb divided by its airspeed is equal to the sine of the flight path angle $\gamma$. Since the aircraft's rate of climb is measured by barometric elements which are free of cumulative errors, a signal representing rate of climb is utilized to correct the computation of the yaw axis acceleration. The integrator output signal $\gamma$ is coupled to a sine function generator 20 to produce a signal representing sin $\gamma$. The signal sin $\gamma$ is coupled to a multiplier 22 together with a signal V derived from the airspeed sensor 16 to produce the output signal $V \sin \gamma$. This signal, because it is derived from apparatus having only short term accuracy is likewise only accurate for short terms. A climb indicator 24 provides an output signal $h$ representing the aircraft's rate of climb. This signal $h$ is coupled to a summing amplifier 26 together with the signal $V \sin \gamma$. Summing amplifier 26 operates to produce a signal representative of the difference between $h$ signal and said $V \sin \gamma$ signal. The output signal from summing amplifier 26 is then coupled to the input of summing amplifier 12 to be algebraically added into the summation of $a_T - g$ and $a_C$. Without the coupling between summing amplifiers 12 and 26, when the centripetal acceleration $a_C$ is in error due to a long term error being generated by accelerometer 10, the output signal $\gamma$ from integrator 18 will be correspondingly in error. With the coupling in, however, the error will be corrected. For instance, when the accelerometer output signal is erroneously low, the summing amplifier 12 output signal is correspondingly lower than it should be. This being the case, the divider 14 output signal, the integrator 18 output signal, the sine function generator 20 output signal and the multiplier 22 output signal will all be erroneously low. However, the output signal from summing amplifier 26 will be higher than it should be. This is because the erroneously low multiplier 22 output signal $V \sin \gamma$ is subtracted from the climb indicator output signal $h$ which is stable over long time periods. This summing amplifier 26 output signal is coupled to summing amplifier 12 wherein it is algebraically added into the computation of the yaw axis acceleration. Since the summing amplifier 12 has two erroneous signals applied thereto, one being too high and one being too low, the errors cancel each other and permit accurate computation of the flight path angle $\gamma$. Obviously, for accelerometer 10 output signals which are erroneously high the opposite will occur.

The present invention also does not require an extremely accurate measure of airspeed to accurately compute the flight path angle of the craft. That is, minor errors in the measurement of airspeed can be tolerated. For instance, when the airspeed signal V is slightly smaller in value than it should be, the output signal from divider 14 will be slightly erroneously high. Consequently, integrator 18 and sine function generator 20 will also have slightly erroneously high output signals. However, multiplier 22 produces the product of the erroneously low signal V and the erroneously high output signal from sine function generator 20. Since these signals have errors which are in opposite directions, the errors tend to cancel each other, resulting in a fairly accurate multiplier 22 output signal. This multiplier 22 output signal is then used, as described above, to aid in correcting the summing amplifier 12 output signal.

Figure 2:
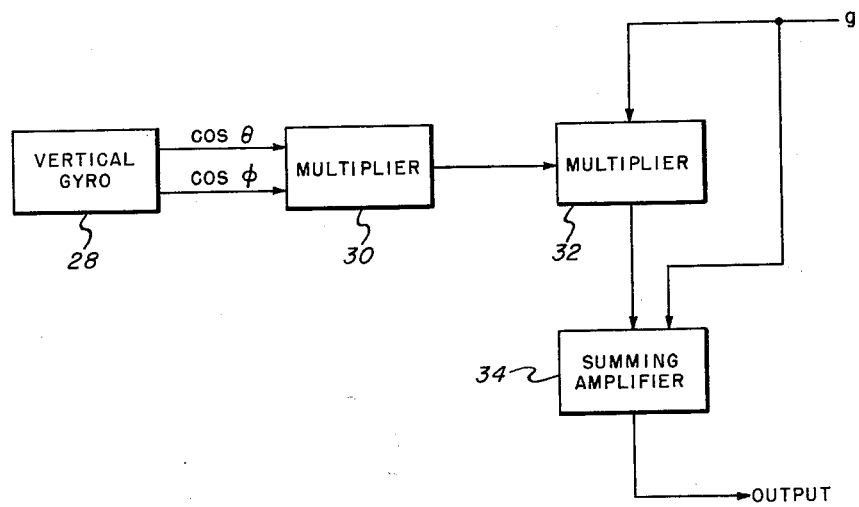
FIG. 2 is a block diagram of a circuit which, when operable with the embodiment shown in FIG. 1, makes the operation of that embodiment accurate in the presence of large roll and pitch angles.

Referring to FIG. 2, a block diagram is shown of a circuit whose output signal, when coupled to the input of summing amplifier 12 of FIG. 1, enables the circuit of FIG. 1 to accurately compute the flight path angle $\gamma$ during periods when large aircraft roll and pitch angles are experienced. In FIG. 2 a vertical gyro 28, from which signals representative of the cosines of the roll angle $\phi$ and the pitch angle $\theta$ may be derived, applies these signals to a multiplier 30. Multiplier 30 operates to produce a signal representing the product, $\cos \phi \cos \theta$. The signal $\cos \phi \cos \theta$ is coupled to a multiplier 32 together with a signal representative of the gravitational acceleration $g$ to produce a signal $g \cos \theta \cos \phi$. This last-mentioned signal is representative of the true yaw axis acceleration due to gravity which the aircraft experiences at times when aircraft roll and pitch angles are large. Since the accelerometer 10 is biased by a signal representative of the gravitational acceleration $g$ to simplify computation of the centripetal acceleration $a_C$ in FIG. 1, use of the biased accelerometer 10 in systems which accurately measure the yaw axis acceleration due to gravity requires that the accelerometer bias signal $g$ be cancelled out. A summing amplifier 34 is provided in the circuit of FIG. 2 to enable the cancellation of the accelerometer bias signal $g$. Summing amplifier 34 has coupled thereto a signal $g \cos \theta \cos \phi$ representing the true yaw axis acceleration due to gravity and a signal $g$ representing the gravitational acceleration. Summing amplifier 34 provides an output signal which is representative of the difference between its two input signals. When the accelerometer 10 output signal $a_T - g$ and the output signal $g \cos \theta \cos \phi - g$ from summing amplifier 34 are applied to summing amplifier 12 for accurate measurement of the flight path angle $\gamma$ during periods when the aircraft experiences high pitch and roll angles, the bias accelerations cancel each other and the remaining acceleration signals are the total yaw axis acceleration $a_T$, the centripetal acceleration $a_C$ and the acceleration due to gravity $g \cos \theta \cos \phi$. These remaining accelerations when algebraically added together equal zero.

While the invention has been described in its preferred embodiments, it is to be understood that the words which have been used are words of description rather than of limitation and that changes within the purview of the appended claims may be made without departing from

What is claimed is:

1. Apparatus for computing the flight path angle of an aircraft comprising means computing flight path angle from an expression of the aircraft acceleration along the yaw axis, said expression including terms which are accurate over a short period of time, means computing a second expression of aircraft flight path angle, said second expression including terms which are accurate over a long period of time, means comparing the results of both said computations to produce the difference therebetween, and means algebraically adding said difference to the result of the computation of said first expression, thereby providing a measure of flight path angle which has both long and short term accuracy to instill long term accuracy in the result of the computation of said aircraft acceleration.

2. Apparatus for computing the flight path angle of an aircraft comprising computing means producing a signal representing the centripetal acceleration of said aircraft, first summing means coupled to receive said acceleration signal, second means producing a signal representing the airspeed of said aircraft, third means coupled to said first summing means and said second means to produce a signal representing the quotient of said first summing means and said second means outputs, fourth means coupled to said third means to produce a signal representing the integral of said third means output, said integral signal being a signal-representing flight path angle, fifth means coupled to said fourth means to produce a signal representing the sine of said fourth means output, sixth means coupled to said second means and said fifth means to produce a signal representing the product of said second and fifth means outputs, seventh means producing a signal representing the rate of climb of said aircraft, and eighth means coupled to said sixth and seventh means to produce a signal representing the algebraic sum of said sixth and seventh means outputs, said eighth means being also coupled to said first summing means to algebraically add said eighth means output signal to the signal representing said centripetal acceleration.

3. Apparatus for computing flight path angle of an aircraft comprising means producing a signal representing the aircraft acceleration along the yaw axis of the craft, second means producing a signal representing the acceleration due to gravity, third means coupled to said first and second means to produce a signal representing the algebraic sum of said first and second means output signals, fourth means producing a signal representing the airspeed of said aircraft, fifth means coupled to said third and fourth means to produce a signal representing the quotient of said third and fourth means output signals, and sixth means coupled to said fifth means to produce a signal representing the integral of said fifth means output signal, said sixth means output signal being a signal representing the flight path angle of said aircraft.

4. Apparatus for computing the flight path angle of an aircraft comprising computing means producing a signal representing the centripetal acceleration of said aircraft, first summing means coupled to receive said acceleration signal, second means producing a signal representing the airspeed of said aircraft, third means coupled to said first summing means and said second means to produce a signal representing the quotient of said first summing means and said second means outputs, fourth means coupled to said third means to produce a signal representing the integral of said third means output, said integral signal being a signal representing flight path angle, fifth means coupled to said second and fourth means to produce a signal representing the product of said second means output and a function of the output of the fourth means, sixth means producing a signal representing the rate of climb of said aircraft, and seventh means coupled to said fifth and sixth means to produce a signal representing the algebraic sum of said fifth and sixth means outputs, said seventh means being also coupled to said first summing means to algebraically add said seventh means output signal to the signal representing said centripetal acceleration.

5. The structure of claim 2 wherein said computing means comprises means producing a signal representing the total yaw axis acceleration of said aircraft, means producing a signal proportional to the gravitational acceleration and third means algebraically adding to the yaw axis acceleration signal and the gravitational acceleration signal to compute the centripetal acceleration of said aircraft.

6. The structure of claim 2 wherein said computing means comprises means producing a signal representing the total yaw axis acceleration of said aircraft, means producing a signal proportional to the gravitational acceleration, means producing a signal proportional to the cosine of the angle said aircraft pitches, means coupled to receive the gravitational acceleration signal and the signal representing the cosine of the pitch angle to produce a signal proportional to their product, and means coupled to receive the yaw axis acceleration signal and the product signal to produce a signal proportional to their algebraic sum, said last mentioned means output signal being proportional to the centripetal acceleration of said aircraft.

7. The structure of claim 2 wherein said computing means comprises means producing a signal representing the total yaw axis acceleration of said aircraft, means producing a signal proportional to the gravitational acceleration, means producing a signal proportional to the cosine of the angle said aircraft rolls, means coupled to receive the gravitational acceleration signal and the signal representing the cosine of the roll angle to produce a signal proportional to their product, and fifth means coupled to receive the yaw axis acceleration signal and the product signal to produce a signal proportional to their algebraic sum, said last mentioned means output signal being proportional to the centripetal acceleration of said aircraft.

8. The structure of claim 2 wherein said computing means comprises means producing a signal proportional to the total yaw axis acceleration of said aircraft, means producing a signal proportional to the gravitational acceleration, means producing a signal proportional to the cosine of the angle said aircraft pitches, means producing a signal proportional to the cosine of the angle said aircraft rolls, means coupled to receive the signals representing the cosines of the pitch and roll angles to produce a signal proportional to their product, means coupled to receive the gravitational acceleration signal and the product signal to produce a signal proportional to their product, and means coupled to receive the output signal from said last mentioned means and the yaw axis acceleration signal to produce a signal proportional to their algebraic sum, said last mentioned means output signal being proportional to the centripetal acceleration of said aircraft.

9. Apparatus for computing the flight path angle of an aircraft comprising means producing a signal representing the centripetal acceleration of said craft, means producing a signal representing the speed of said craft, first computing means receiving said acceleration signal and said speed signal producing therefrom a first signal representing the craft flight path angle, means producing a signal representing the craft rate of climb, second computing means receiving said climb rate signal and said speed signal producing a second signal representing flight path angle, comparison means receiving said first and second flight path angle signals producing a signal representing the error therebetween, and means receiving said first flight path angle signal and said error signal algebraically summing said signals to produce a signal accurately representing the flight path angle of said craft.

10. Apparatus for computing the flight path angle of an aircraft comprising means producing a signal representing the centripetal acceleration of said aircraft, means producing a signal representing the speed of said aircraft, means receiving said acceleration signal and said speed signal producing a signal representing the quotient thereof, means receiving said quotient signal producing a signal representing the time integral of said quotient signal, said integral signal being a first signal representing the flight path angle of the craft, means producing a signal representing the craft climb rate, and computing means receiving said climb rate signal and said speed signal producing a second signal representing the craft flight path angle, comparison means receiving said first and second flight path angle signals producing a signal representing the error therebetween, and means receiving said first flight path angle signal and said error signal algebraically summing said signals to produce a signal accurately representing the flight path angle of said craft.

References Cited in the file of this patent

UNITED STATES PATENTS

| | | |
|---|---|---|
| 2,896,145 | Snodgrass | July 21, 1959 |
| 2,932,467 | Scorgie | Apr. 12, 1960 |
| 2,934,267 | Wirkler et al. | Apr. 26, 1960 |